United States Patent
Arko et al.

(10) Patent No.: US 11,102,071 B2
(45) Date of Patent: Aug. 24, 2021

(54) APPROACH TO DEFINING COMPUTER SYSTEM CONFIGURATION DEFINITIONS

(71) Applicant: HEWLETT PACKARD ENTERPRISE DEVELOPMENT LP, Houston, TX (US)

(72) Inventors: David Arko, Ft. Collins, CO (US); Mark M. Bunner, Ft. Collins, CO (US); Kari Whitcomb, Ft. Collins, CO (US); Keith L. Kelley, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 69 days.

(21) Appl. No.: 16/136,966

(22) Filed: Sep. 20, 2018

(65) Prior Publication Data
US 2020/0099583 A1    Mar. 26, 2020

(51) Int. Cl.
G06F 15/16 (2006.01)
H04L 12/24 (2006.01)
H04L 29/08 (2006.01)

(52) U.S. Cl.
CPC ...... *H04L 41/0843* (2013.01); *H04L 41/0813* (2013.01); *H04L 41/0893* (2013.01); *H04L 41/22* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 6,950,931 B2 | 9/2005 | Wedlake | |
| 7,603,443 B2 | 10/2009 | Fong et al. | |
| 7,793,087 B2* | 9/2010 | Zenz | G06F 9/44505 713/1 |
| 7,870,538 B2 | 1/2011 | Zenz et al. | |
| 2003/0225867 A1* | 12/2003 | Wedlake | H04L 41/0893 709/222 |
| 2008/0028048 A1* | 1/2008 | Shekar CS | G06F 9/44505 709/220 |
| 2012/0297059 A1* | 11/2012 | Bross | G06F 11/3051 709/224 |
| 2015/0207682 A1* | 7/2015 | Moraes Nichele | G06F 15/177 709/221 |
| 2016/0294728 A1 | 10/2016 | Jain et al. | |
| 2017/0212772 A1 | 7/2017 | Wilkinson et al. | |

FOREIGN PATENT DOCUMENTS

CN    106371891    2/2017

OTHER PUBLICATIONS

Cisco.com; "Cisco UCS Manager Configuration Common Practices and Quick-start Guide"; Jan. 23, 2014; 27 pages.

* cited by examiner

*Primary Examiner* — Normin Abedin
(74) *Attorney, Agent, or Firm* — Nolte Lackenbach Siegel

(57) ABSTRACT

Server management software providing functionality that eliminates proliferation of server profile templates due to small variations in server hardware types for newly configured systems is provided. The server management software allows a user to specify one or more hardware requirements or parameters for a server hardware template that applies the template across a broader range of hardware configurations rather than to one specific configuration.

20 Claims, 6 Drawing Sheets

FIG. 3

| | | Device Type | Max Port Speed | Physical Ports | Virtual Ports | Available Virtual Functions | Virtual Function Allocation Increment | Ethernet | FC | iSCSI |
|---|---|---|---|---|---|---|---|---|---|---|
| Mezzanine 1 | Smart Array P542D Controller | SAS | 10 Gb/s | 2 | n/a | None | None | No | No | No |
| Mezzanine 3 | HPE Synergy 3820c 10/20Gb Converged Network Adapter | Ethernet | 20 Gb/s | 2 | 16 | 256 | 8 | Yes | Yes | Yes |

OneView | Search

Server Hardware Types 7

Create custom type
Sort by Name ▲

SY 480 Gen9 1
- Mezzanine 1 Smart Array P542D Controller
- Mezzanine 3 HPE Synergy 3820C 10/20Gb Converged Network Adapter SY 480 Gen9 2
- Mezzanine 2

⊙ SY 480 Gen9 1 | General ▾
— 302

Actions ▾

General
Server model: Synergy 480 Gen9 Computer Module
From factor: Half-height
Description: none
Used by: 3 server hardware

Adapters

Location ▲  Model

— 304

300

Create Custom Server Hardware Type

| | |
|---:|:---|
| Name | My Generic DL Server |
| Copy existing Server | Search  v |
| Server model | ◯ Exact  DL380 |
| | ⦿ Expr  DL*  — 402 |
| | ◯ Any |

Adapters

| ID/Name | Device Type | Model | Location | Phys Ports | Virtual Ports | Ethernet | FC | iSCSI | Edit |
|---|---|---|---|---|---|---|---|---|---|
| 1 | Fibre Channel | * | * | 2 - 4 | n/a | No | Yes | No | X Edit |
| 2 | Ethernet | * | * | 2 | 8 | Yes | No | Yes | X Edit |

[Add]

Oth

Ethernet   CPUs [2] Mi [4] M — 404
           Memory [8G] Mi [*] M

[Ad] [Add] [Canc]

FIG. 4

APPROACH TO DEFINING COMPUTER SYSTEM CONFIGURATION DEFINITIONS

BACKGROUND

Server system management software packages are used to define how a group or class of computer systems are configured prior to use. During the configuration process, the server system management software is responsible for the creation and use of server profile templates that define the parameters of known systems matching sever hardware types. These server profile templates are used by the system management software as the basis for creating an individual server profile for each different managed server added to the system. However, variations in newly installed hardware, such as a different adapter model or a newer version of an existing server, may generally entail a different server template being created by the server system management software, as existing templates may not apply to the new server hardware when there is a variation from the server profile template. The challenge with this process is that there are numerous options for server hardware configurations available from multiple manufacturers, and as such, it is common to have multiple different types, models, sizes, etc. of servers in a managed system, which in turn causes creation of multiple server profile templates since a new template for every different hardware configuration is generally needed.

BRIEF DESCRIPTION OF THE DRAWINGS

So that the manner in which the recited features, advantages and objects of the present disclosure may be understood in detail, a more particular description of the invention, briefly summarized above, may be had by reference to the examples thereof which are illustrated in the appended drawings. It is to be noted, however, that the appended drawings illustrate only typical examples of this invention and are therefore not to be considered limiting of its scope, for the invention may admit to other equally effective examples.

FIG. 3 illustrates an example graphical user interface for a server management software during selection of a new custom server hardware type.

FIG. 4 illustrates an example graphical user interface for a server management software during creation of a custom server hardware type.

DETAILED DESCRIPTION

Figure 1:
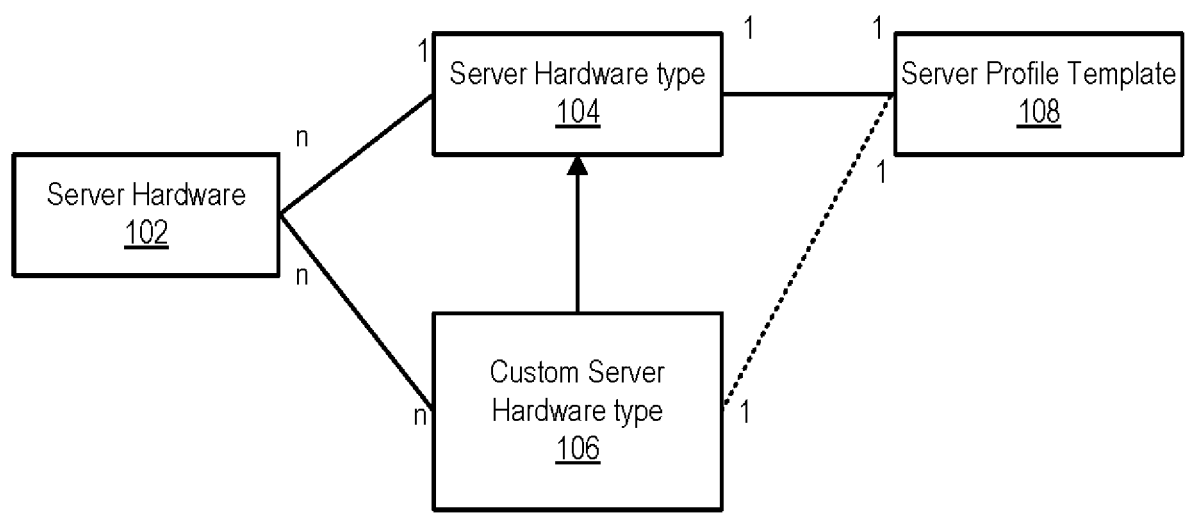
FIG. 1 is an example schematic illustrating the relationship between server hardware, server hardware types, and templates in server management software.

In the following, reference is made to examples of the inventive concept of this disclosure. However, it should be understood that the inventive concept is not limited to described examples. Instead, any combination of the following features, elements, or functionalities, whether related to different examples or not, is contemplated by the inventors as a possible combination that may be used to implement and practice an aspect of the present innovation. Furthermore, in various examples the innovation of this disclosure provides numerous advantages over the prior art, and although the examples of the present innovation may achieve advantages over other possible solutions and/or over the prior art, whether or not a particular advantage is achieved by a given example is also not intended to be limiting on the scope of the present disclosure. Therefore, the following aspects, features, functionalities, examples, and advantages are intended to be merely illustrative and are not considered elements or limitations of the appended claims, except where explicitly recited in a claim. Similarly, reference to "the invention" or "the innovation" are not to be construed as a generalization of any inventive subject matter disclosed herein and shall not be considered to be an element or limitation of the appended claims except where explicitly recited in a claim.

Examples of the present disclosure provide a server management software functionality that eliminates proliferation of server profile templates resulting from variations in server hardware types for newly configured systems. In an example of the present disclosure, server management software allows a user to specify one or more hardware requirements or parameters for a server profile template that applies the template across a broader range of hardware configurations rather than to a specific hardware configuration. For example, the user could specify a "2 port Ethernet adapter" without specifying a slot location, model, or speed of the Ethernet adapter, thus allowing the template to apply to similar adapters in different slot locations, adapters from varied manufacturers, various models of adapters, or adapters operating at different data speeds. This allows users to select certain hardware configuration parameters in a while more generally selecting non-essential hardware parameter preferences. Therefore, when a server profile template is applied to a new server, the hardware requirements will be mapped to the newly discovered hardware without requiring an additional configuration. During this process, the user interface of the server management software may guide the user to know which servers the server profile templates could be applied by filtering templates that do not meet the specified hardware requirements and presenting the user with a list of possible templates as a base to use to modify to create a broader template of the present disclosure.

Server management software generally controls the tasks and services that are done on a server to manage its overall operation. Server management software may monitor the server and apps running on the server, periodically checking their status, uptime, and monitoring for any new or recurring issues. Server management software may also oversee updating installed server hardware and software along with the setup and configuration of servers on the managed system. Server management software may be provided as a hardware appliance, sometimes called a composer, or as virtual appliance for uncomplicated deployment. An example of commercially available server management software is OneView by Hewlett Packard Enterprise of Palo Alto, Calif.

Server management software may follow a step-by-step process for adding new resources being brought under management. A guided setup may direct users through the configuration steps required to prevent missing principal configuration requirements. Therefore, when a user adds a hardware device, the server management software may automatically detect the new hardware device and prepare it for monitoring and management. New server hardware, for example, either matches an existing server template, which is allocated and fully configured, or it has no server template that applies and is available as raw hardware in a global pool awaiting a new configuration by the user, which requires setting up a new server template for the hardware.

In an example of the present disclosure server management software is configured to add managed hardware where existing templates do not match the configuration of the new managed hardware. In this situation the server management software allows a user to select various parameters in a template to configure the template to apply to parameters of the new managed hardware broadly without specifying, for example, non-essential parameters of the new managed hardware so that the newly created template may more broadly cover subsequently added managed hardware. Non-essential parameters are generally those parameters that are not critical to the operation of the new hardware in the system. For example, a non-essential parameter may be a data throughput speed of an adapter, where the user may specify that as long as the throughput speed is above a specified parameter, then the template will apply to the new hardware.

FIG. 1 is a schematic illustrating the relationship between server hardware, server hardware types, and templates in server management software. The new server hardware is shown schematically at 102 and the server hardware type 104 is shown as having a 1:n relationship with the server hardware, as represented by the superscript numbers at the terminating ends of the interconnecting lines. Therefore, for server hardware 102 there is a server hardware type 104. Similarly, the custom server hardware type is shown as having an n:n relationship ratio to the server hardware, so for server hardware 102 there are multiple (n) custom server hardware types 106. Further, the schematic of FIG. 1 illustrates that there is a 1:1 relationship between the server profile template 108 and both the server hardware type 104 and the custom server hardware type 106.

The example schematic of FIG. 1 shows that the server hardware 102, which is representing the actual to be added new hardware component or system, has a 1:1 relationship with the server hardware type 104, which is identifying information about the hardware that the server management software uses to create a profile for the new hardware component or system. The custom server hardware type 106 is created by the user or admin of the server management software. The creation of the server hardware type 106 by the user allows a server hardware type to be modified to indicate individual parameters that are to be included in the template and that are matched to be able to apply the profile, and similarly, to specify parameters that are not critical to the operation of the server system. Therefore, given the relationships noted above, a server hardware type 104 may reference or be applied to more than one server hardware 102 if the server hardware is identical. Conversely, in an example of the present disclosure a custom server hardware type 106 may apply to more than one server hardware 102 because the custom server hardware types 106 are created specifying critical parameters and leaving unnecessary parameters broadly defined, which allows for more devices to be covered by a single template.

Figure 6:
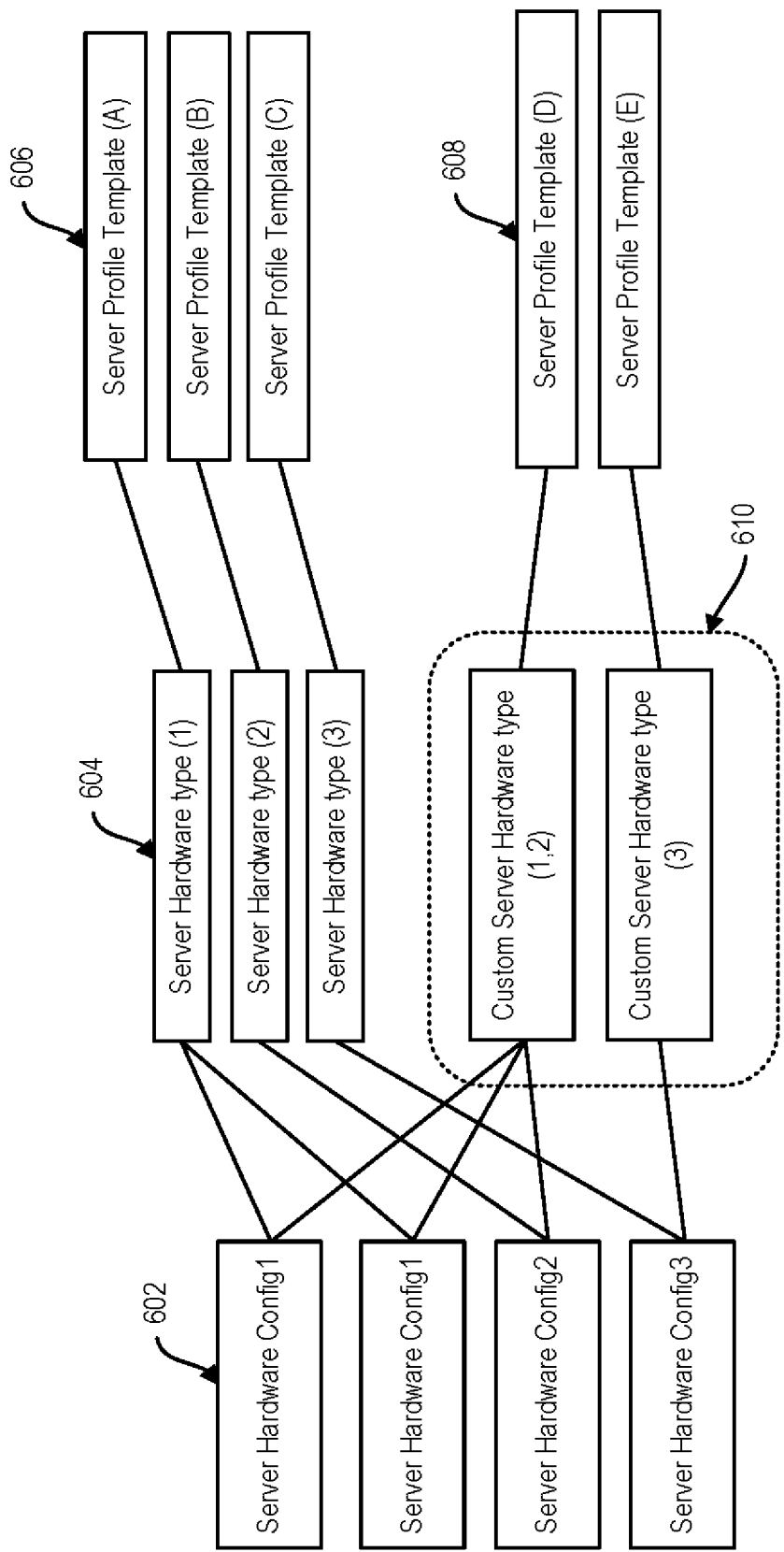
FIG. 6 is an example schematic of the relationship between server hardware, server hardware types, and templates in server management software.

FIG. 6 also illustrates example schematic of the relationship between server hardware, server hardware types, and templates in server management software. The example schematic shows the server hardware 602 in a conventional management system corresponding with server hardware types 604 in a 1:1 relationship where each server hardware type corresponds to a specific hardware configuration. As such, the schematic illustrates that the first two server hardware configurations (Config1) are the same. In this arrangement thee will be three templates 606 generated by the server management software. The present disclosure provides a reduction in the number of required templates 608 by providing custom server hardware types 610 that apply to multiple different configurations of server hardware 602. For example, one Custom Server Hardware Type (1, 2) 610 applies to both server hardware configurations Config1 and Config2, and these are different physical hardware configurations, and the Custom Server Hardware Type 610 requires only a one template 608 to cover all three Server Hardware Configurations (Config1, Config1, and Config2).

Templates are electronic data sets of predefined parameters that are the basis for creating server profiles, which are device specific data sets. A server template is used to define expected configuration settings for a new application server. In general, when a user installs a new application server, a profile for the new application server must be created. The user may generally either select to apply a new (to be created) server template as a basis for creating the profile or apply a previously used template that is based on another already existing application server if the new application server matches a previously used application server template. When an existing template is used, the server management software creates a profile for the new application server by copying the data from the existing server template into the new application server profile to configure the new application server for management under the server management software.

Using the example broader template defining the principal parameters of the device being added prevents users from having different server profile templates for every server hardware type, i.e., for every variation of server hardware in existing systems the user will generally have a new server profile template. Therefore, existing users are generally make a copy of an existing template and modify it to apply to a variation in hardware, where with the example custom server hardware type the user can specify parameters in the template that can vary and still be operable in the system. This more flexible definition of the hardware in the templates provides a reduction in number of templates created that are managed by the server management software.

In operation, when a user wants to add a new managed server to be managed by the server management software or the appliance thereof using example methods or software of the present disclosure, then the user instructs the appliance to add this server through a graphical user interface. The server management software then analyzes the configuration of the server by querying a local embedded management card or device on the server that is configured to manage low level functionality, such as an integrated lights out card (iLO) provided by Hewlett Packard Enterprise of Palo Alto, Calif. iLo is an embedded server management processor that provides out-of-band management facilities through a physical Ethernet connection port that can be found on most servers and micro servers. Other manufacturers offer similar functionality, such as Sun/Oracle's LOM port, Dell's DRAG, IBM's Remote Supervisor Adapter, and Cisco's CIMC. The local embedded management card or device responds to the server management software query with details about the configuration parameters of the new server.

Figure 2:
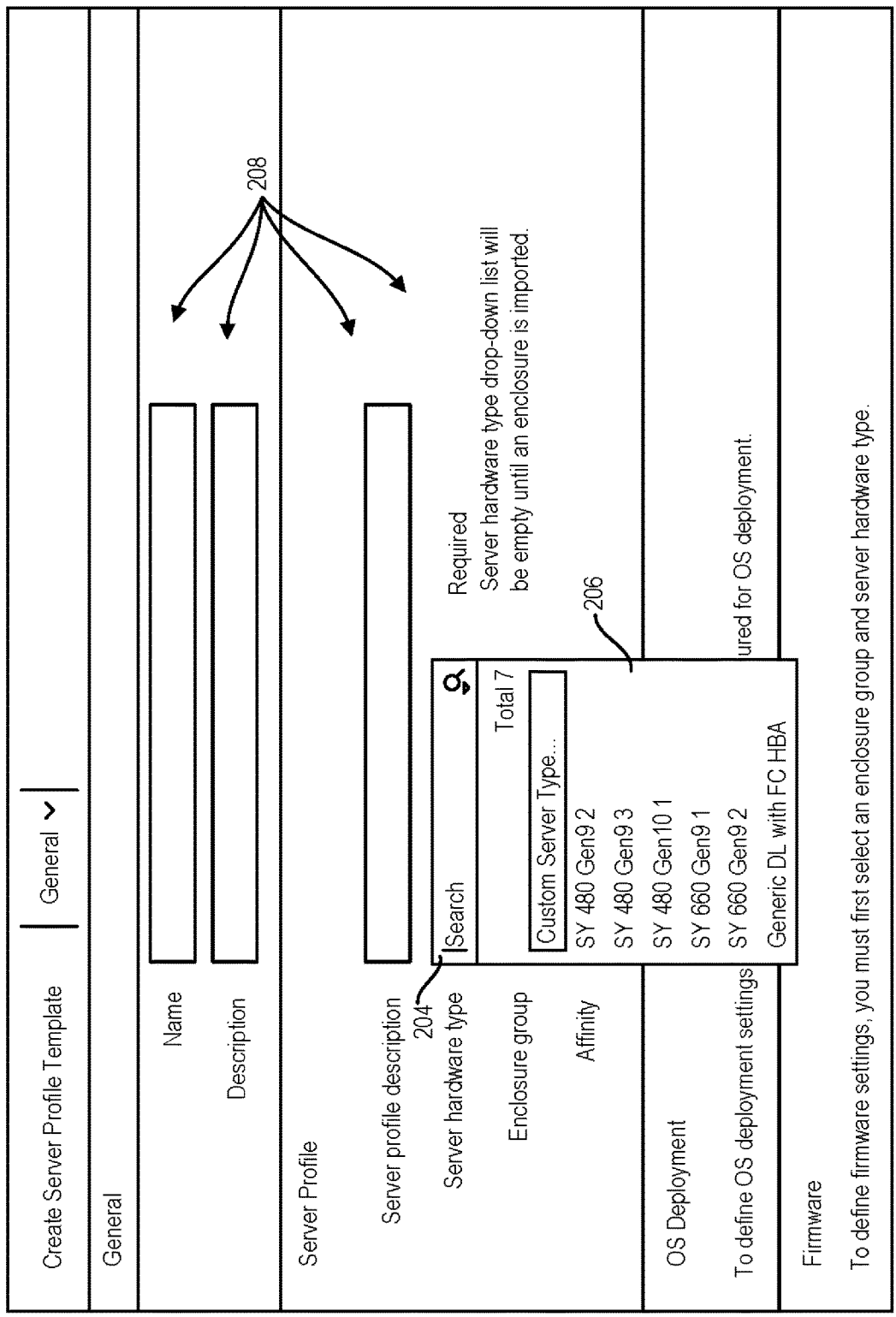
FIG. 2 illustrates an example graphical user interface showing creation of a server profile template.

Once the server management software queries the appliance on the new device and gathers the configuration information, the server management software then creates the server hardware type. This new server hardware type will show up in the graphical user interface for the server management software as an available manageable server that the user can select to add to the managed pool. FIG. 2 shows an example graphical user interface showing creation of a server profile template 202. The server profile template 202 being created includes a plurality of user specified fields 208 along with a server hardware type field 204. The server hardware type 204 field also includes a drop-down menu 206 listing the available (known) server hardware types 204. The user can select a server hardware type 204 to apply an existing server profile template and attempt to apply the selected server hardware type 204 to the new server. This selection process initiates the server management software creating a server profile for that specific new server.

However, if the new server is a new variation of servers not covered by an existing server hardware type, then a new server hardware type 204 is be generated, as the existing server hardware types are not applicable to the new server. When a new server hardware type 204 that applies to the new server hardware and that is a more flexible variation that applies to more than one server hardware needs to be created, the server management software is used to generate a new custom server hardware type. During this process the server management software may include select configuration parameters (fields 208), such as network adapters, amount of memory, server model, etc., and these configuration parameters are saved as the custom server hardware type for the new server. The configuration parameters selected by the user may be saved as a new custom template, where one or more of the parameters entered by the user are broad or general parameters selected to apply to more than one specific device, thus increasing the scope or coverage of the custom template to cover multiple devices of varying configurations. FIG. 3 illustrates an example graphical user interface 300 for a server management software initiating selection of a new custom server hardware type. The graphical user interface shows the "create a custom type" selection 302 and several template parameters 304 that have been prepopulated with queried data from the new server hardware.

FIG. 4 illustrates an example graphical user interface 400 for a server management software during creation of a custom server hardware type. The graphical user interface 400 shows a plurality of user selectable fields, such as the server model field 402. The user has the option in the server model field 402 to select a server model, an expression of server model, or "any" server model. In the example the user has selected an expression of the server model and has filled in "DL*" which an expandable expression indicating that this custom server hardware type will apply to any DL server model regardless of the model characters or numbers that follow the DL, such as DL380 for example. Using this custom server hardware type template allows the user to apply the template to any DL server, where previous templates generally specified the server model, thus generating more templates to manage. Similarly, the graphical user interface 400 also includes a lower an upper range fields for memory 404 that the user can select as part of the creation of the custom template. In the example graphical user interface 400 the user has specified that the minimum memory amount is 8 gigabytes but there is no maximum memory amount specified, as the field for the maximum memory amount 404 is populated with the universal expandable character "*" indicating that any memory value (above 8 gigabytes) satisfies the template requirement. Therefore, again the template application is broadened as any memory amount of 4 gigabytes or larger will be covered by the template, resulting in fewer required templates for hardware variations and reduced template proliferation.

Figure 5:
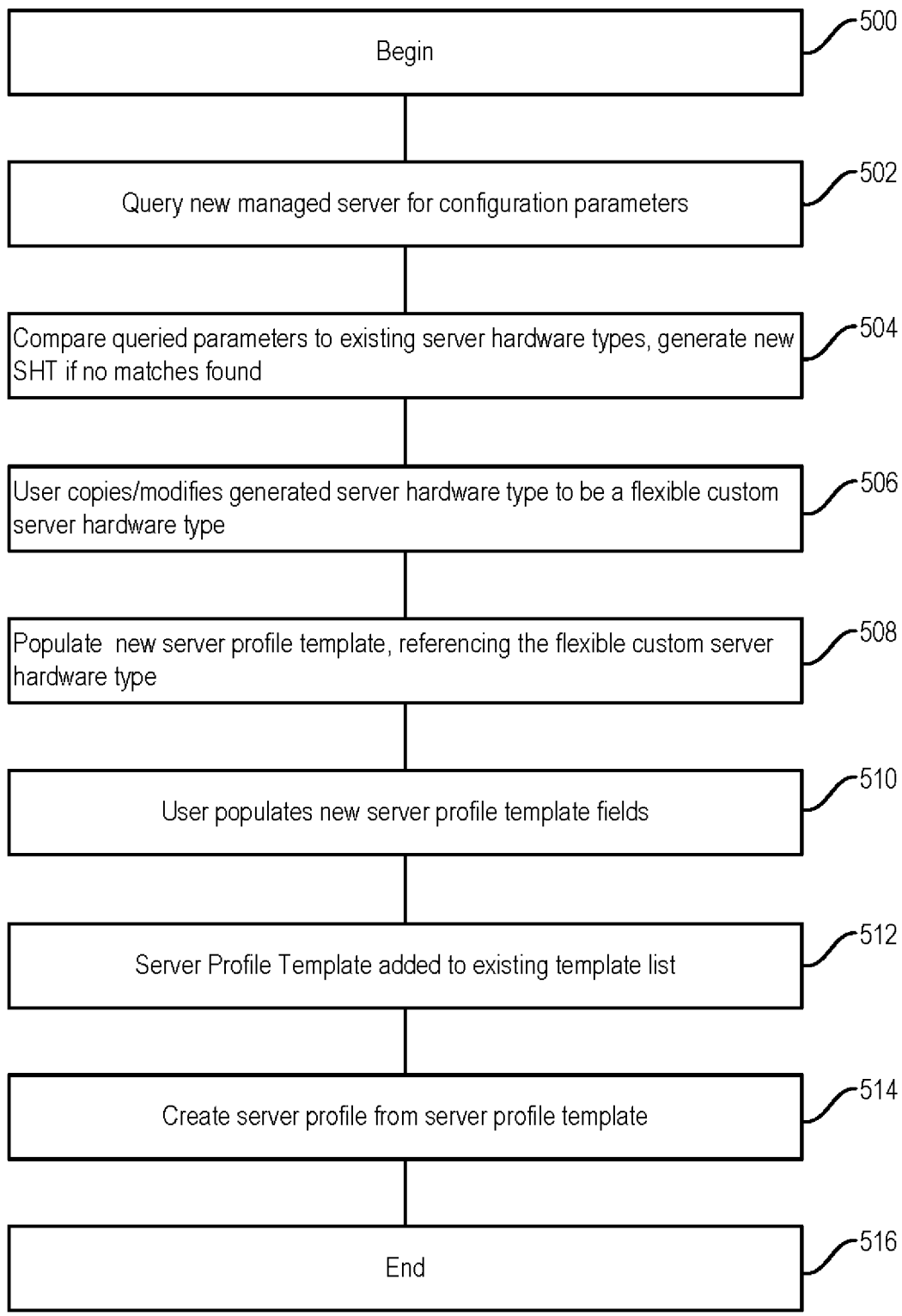
FIG. 5 illustrates an example method of the disclosure.

FIG. 5 illustrates an example method of the present disclosure. The example method begins at step 500 and continues to 502 where the management software, which may be server management software, queries a local embedded management card or device on the new managed server to determine various configuration parameters for the new managed device or server that are needed to complete the management setup. At 504 the method compares the queried configuration parameters to an existing device or server hardware template to determine if the queried configuration parameters for the new device or server match an existing server hardware template. If there is no match, the method generates a new device or server hardware template. If a match is determined, then the new server may have a configuration profile created based upon the matching template. If no match for the queried configuration parameters for the new server is found in the existing templates, then the method continues to 506 where a new device or custom server hardware template representative of the new managed device or server is generated based on the queried configuration parameters. At 508 the new custom device or server hardware template may be at least partially populated with queried configuration parameters from the new device or server using or referencing a flexible or dynamic parameter of the custom server hardware type. At 510 the method may populate one or more nonessential fields of the new custom device or server hardware template with parameters applicable to multiple devices or servers having different characteristics for the nonessential field, i.e., with a parameter that will apply to multiple new devices or servers where the devices or servers have different values for the nonessential field parameter. Once the new custom device or server hardware template is created, it may be used to create a profile for the new device or server that the device or server management software may use to configure the new device or server for management at 512. Additionally, the new custom device or server hardware template may be added to a list of available templates used by the device or server management software at 514. The example method ends at 516.

In the example method, the process of the server management software querying a local embedded management card or device on the new managed server to determine various configuration parameters for the new managed server that are used to complete the management setup may be conducted by an appliance residing in the server enclosure operating to run code that when executed operates as the server management software. Further, the method may include generating the new custom server hardware type template if the comparing determines the configuration parameters of the new server do not match any of the existing server hardware templates.

Further still, in the example method partially populating fields of the new custom server hardware template with the queried configuration parameters may include the server management appliance matching the queried configuration parameters with corresponding fields in the new custom server hardware template and automatically filling the matched fields with the queried parameters. These auto filled fields may subsequently be presented to a user for approval or modification as desired. The nonessential fields in the template may generally be populated by a user entering data into a graphical user interface of a server management software appliance to fill the fields with parameters that allow the template to apply to a broader range of devices. More particularly, the template's principal fields, as designated by the user, contain device parameters that are important to the operation of the device in the managed system. As such, it is critical that each new device added to the managed system satisfy every principal parameter. Conversely, the non-essential fields represent parameters that are not critical to the operation of devices in the managed system. As such, the non-essential field parameters may be flexible to allow for use of a broader range of equipment that would not meet the requirements of conventional template and profile systems where matches for parameters are required.

The example methods and software described in this disclosure allows users to create custom server hardware types to reduce template proliferation. The example methods and software do not require the actual hardware to create the custom server hardware template, as the query process described above may be skipped and the principal and non-essential fields of a template may be populated from a blank template by the user. Additionally, the user may populate the custom template with an existing server hardware template data by selecting an existing template to apply to the new custom template and then subsequently revise non-essential parameters as desired. The example methods and software described herein provide for fields in the custom server hardware template to be specified precisely, or as a matching or expandable expression, such as "*" or "/Any," to provide broader device coverage as specified by the user. The result is that instead of a server hardware having one and only one server hardware template, multiple custom server hardware templates can match one server hardware, and when configuring a managed server in the server management software or appliance, any server profile template using a SHT/CSHT that matches the SH can be used. As an example, the expandable expression may be dynamic, extensible, adjustable, configurable, or a pseudo expression configured to apply to more than one device or server.

In several of the examples described above the device is described as a server although the present disclosure is not limited in application to only servers, as the software and method of the present disclosure may be equally applicable to various electronic or computing devices that use templates during the management process.

Examples presented in this disclosure may be embodied as a system, method, or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more non-transitory computer readable medium(s) having computer readable program code embodied thereon. Any combination of one or more computer readable medium(s) may be utilized. The computer readable medium may be a computer readable signal medium or a computer readable storage medium. In the context of the disclosure, a computer readable storage medium may be any tangible non-transitory medium that can contain or store data or a program product for use by or in connection with an instruction execution system, apparatus, module, or device. Program code embodied on a non-transitory computer readable medium may be transmitted using any appropriate medium, including but not limited to wireless, wireline, optical fiber cable, RF, etc., or any suitable combination thereof.

Computer program code for carrying out operations for aspects disclosed herein may be written in any combination of one or more programming languages, including object-oriented programming languages such as Java, Smalltalk, C++ and the like or procedural programming languages, such as C+, C #, Objective C, Assembly, Ruby, Python, PHP, and SQL. The program code may be executed on any processor, whether local, remote, or in the cloud to control or analyze data in accordance with examples of this disclosure.

In the preceding, reference is made to examples presented in this disclosure. However, the scope of the present disclosure is not limited to specific described examples. Instead, any combination of the following features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples and advantages are merely illustrative and are not considered elements or limitations of the appended claims except where explicitly recited in a claim(s).

Examples presented in this disclosure are described above with reference to flowchart illustrations or block diagrams of methods, apparatus (systems) and computer program products according to examples disclosed herein. It will be understood that each block of the flowchart illustrations or block diagrams, and combinations of blocks in the flowchart illustrations or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

While the foregoing is directed to examples presented in this disclosure, other and further examples or variations may be devised without departing from the basic scope of contemplated examples, and the scope thereof is determined by the claims that follow.

What is claimed is:

1. A method for configuring a new managed server, comprising:
    receiving, at a server management appliance, configuration parameters from a management controller located at the new managed server;
    comparing, at the server management appliance, the received configuration parameters to existing server hardware templates to determine whether the configuration parameters match an existing server hardware template;
    generating, at the server management appliance, a new custom server hardware template representative of the new managed server based on the configuration parameters;
    populating principal fields of the new custom server hardware template with the configuration parameters, including
        matching the configuration parameters with corresponding fields in the new custom server hardware template; and
        automatically populating the matched fields with the configuration parameters; and
    populating, by a user, a nonessential field of the new custom server hardware template with a parameter applicable to multiple servers having different characteristics representative of the nonessential field wherein a field is designated as a principal or nonessential by a user.

2. The method of claim 1, wherein the server management appliance receiving the configuration parameters comprises a server management appliance communicating with the management controller on the new managed server.

3. The method of claim 1, wherein the server management appliance generating the new custom server hardware type template occurs upon determining that the configuration parameters do not match an existing server hardware template.

4. The method of claim 3, further comprising the presenting, at the server management appliance, the automatically filled field to a user for approval.

5. The method of claim 1, wherein the server management appliance populating the nonessential field comprises a user data entry into a graphical user interface of a server management software appliance.

6. The method of claim 5, wherein the user data entry for the nonessential field includes an expandable expression.

7. The method of claim 1, further comprising adding, at the server management appliance, the new custom server hardware template to existing server hardware templates for comparison to new parameters.

8. The method of claim 7, wherein the server management appliance comparing the configuration parameters to existing server hardware templates comprises comparing the configuration parameters to the new custom hardware template to determine parameter matches.

9. A method for configuring a new managed device, comprising:
electronically querying the new managed device for configuration parameters;
receiving the configuration parameters from the new managed server;
determining whether the received configuration parameters match an existing device hardware template;
generating a new custom device hardware template representative of the new managed device based on the queried configuration parameters upon determining that the comparing determines the configuration parameters do not match an existing device hardware template;
populating principal fields of the new custom device hardware template with the queried configuration parameters, including
matching the configuration parameters with corresponding fields in the new custom server hardware template; and
automatically populating the matched fields with the configuration parameters; and
populating, by a user, a nonessential field of the new custom device hardware template with a parameter applicable to multiple devices having different characteristics representative of the nonessential field wherein a field is designated as a principal or nonessential by a user.

10. The method of claim 9, wherein the new managed device comprises an adapter.

11. The method of claim 10, further comprising populating matched fields with the queried configuration parameters.

12. The method of claim 10, wherein populating the nonessential field comprises user data entry into a graphical user interface of a server management software appliance, wherein the user data entry includes an expandable expression.

13. The method of claim 12, further comprising adding the new custom server hardware template to existing server hardware templates for comparison to new queried parameters.

14. The method of claim 13, wherein comparing the received configuration parameters to existing server hardware templates comprises comparing the queried configuration parameters to the new custom hardware template to determine parameter matches.

15. A non-transitory computer readable medium comprising computer executable instructions stored thereon, that when executed by a processor, cause the processor to perform a method of configuring a new managed device, comprising:
querying a new managed server for configuration parameters by server management software;
receiving the configuration parameters from the new managed server;
determining whether the received configuration parameters match an existing server hardware template;
generating a new custom server hardware template representative of the new managed server based on the queried configuration parameters upon determining that the configuration parameters do not match an existing server hardware template;
populating principal fields of the new custom server hardware template with the queried configuration parameters, including
matching the configuration parameters with corresponding fields in the new custom server hardware template; and
automatically populating the matched fields with the configuration parameters; and
populating, by a user, nonessential fields of the new custom server hardware template by user input with parameters applicable to multiple servers having different characteristics representative of the nonessential field wherein a filed is designated as a principal or nonessential by a user.

16. The non-transitory computer readable medium of claim 15, further comprising populating matched fields with the queried configuration parameters.

17. The non-transitory computer readable medium of claim 16, wherein populating the nonessential field comprises user data entry into a graphical user interface of a server management software appliance, wherein the user data entry includes an expandable expression.

18. The non-transitory computer readable medium of claim 15, further comprising adding the new custom server hardware template to existing server hardware templates for comparison to new queried parameters.

19. The non-transitory computer readable medium of claim 18, wherein comparing the received configuration parameters to existing server hardware templates comprises comparing the queried configuration parameters to the new custom hardware template to determine parameter matches.

20. The non-transitory computer readable medium of claim 15, wherein the new managed device comprises a server.

* * * * *